UNITED STATES PATENT OFFICE 2,188,465

POLYMERIZATION OF OLEFINS

Michael Willcox Perrin, John Greves Paton, and Edmond George Williams, Northwich, England, assignors to Imperial Chemical Industries Limited, a corporation of Great Britain No Drawing. Application August 6, 1937, Serial No. 157,810. In Great Britain August 21, 1936

10 Claims. (Cl. 260—94)

This invention relates to an improved process for polymerizing open chain mono-olefins to semi-solid and solid polymers, particularly to an improved process for producing semi-solid and solid polymers from ethylene.

In copending application, Serial No. 123,722, filed February 2, 1937, by E. W. Fawcett, R. O. Gibson, and M. W. Perrin, there are described new semi-solid and solid polymers of ethylene possessing valuable properties. These polymers are obtained by subjecting ethylene to the action of pressures in excess of 500 atmospheres under controlled, elevated temperature conditions, and separating the polymer from the unconverted ethylene. Under these conditions, the polymerization reaction takes place slowly and smoothly, requiring several hours for completion. It has now been discovered that the reaction can be made to proceed rapidly by including in the ethylene small but definite amounts of oxygen.

This invention has as one object to provide a method for rapidly polymerizing ethylene to semi-solid and solid polymers. A further object is to provide a method which is adaptable for the continuous polymerization of ethylene to semi-solid and solid polymers. Other and further objects will appear hereinafter.

The above objects are accomplished by including in the ethylene definite but small quantities of oxygen and, if desired, separating the polymer formed from the unconverted ethylene, adding more oxygen to the latter, and recycling the mixture alone or admixed with fresh ethylene for a further polymerization.

The polymerization reaction under the conditions described herein is very rapid, generally manifesting itself by a sudden pressure rise on the gauge, followed by a pressure drop. During this rapid reaction from about 5 to about 20 per cent of the ethylene is polymerized, the particular yield of polymer being dependent upon the oxygen content of the ethylene. The amount of oxygen required to initiate this rapid polymerization reaction is generally dependent upon the temperature and pressure conditions employed. Since the oxygen present in the ethylene appears to be consumed during this rapid reaction, it is necessary to add more oxygen to the ethylene if a further rapid polymerization is to be effected. If this is not desired, however, the polymerization may be allowed to continue slowly after the initial reaction.

The amount of oxygen employed in the practice of this invention is that required to initiate the rapid reaction under the particular temperature and pressure conditions employed; generally, however, this amount will range from about 0.01 per cent to about 5 per cent, the particular amount in any one case being determined by the pressure and temperature conditions, and by the efficiency of the means employed for dissipating the heat of reaction.

As pointed out above, the percentage of ethylene converted to polymer in this rapid reaction, at a given temperature and pressure, increases with the oxygen content until the latter reaches a certain limiting value beyond which explosive decomposition is liable to occur. Generally, however, the higher the oxygen content of the ethylene the lower the molecular weight of the resultant polymer. If more than the critical amount of oxygen is present, the temperature rises locally in the gas so high that it exceeds the critical temperature above which explosive decomposition of the ethylene takes place.

The conditions of temperature and pressure employed in the practice of this invention are essentially those given in the aforementioned copending application of Fawcett, Gibson, and Perrin. These comprise the use of pressures of at least 500 atmospheres and preferably at least 1000 atmospheres; generally, however, it is preferred not to employ pressure in excess of 3000 atmospheres; the use of moderately elevated temperatures between about 100° and about 400° C., and preferably between about 150° and about 250° C.; careful control of the thermal conditions during the polymerization, in the sense that the heat of reaction must be rapidly dissipated to avoid an undue rise in temperature. If the oxygen content of the ethylene is very low, the requirement of the rapid removal of the heat of reaction is less important than when (within the allowable range) the oxygen content is relatively high, but the yield of polymer is lower in the former than in the latter case. Generally, however, the more efficient the removal of the heat of reaction the higher the tolerable oxygen content of the ethylene.

The general effect of increasing the pressure is to increase the molecular weight of the polymer, also to accelerate the reaction; increasing the temperature will accelerate the reaction also, but tends to give a product of lower molecular weight. Hence, for a given oxygen content, high pressure/low temperature conditions (within the operative range) give products of high molecular weight, and low pressure/high temperature conditions products of low molecular weight. Increasing the oxygen content (within the allowable range), apart from its specific effect on the reaction, also influences the molecular weight of the product in the direction of lowering the same. It is to be understood that whatever the temperature-pressure-oxygen content conditions chosen, the heat of reaction must in all cases be suitably dissipated to prevent the temperature from exceeding the value at which, instead of polymerization, the alternative explosive decomposition reaction occurs. Suitable measures to achieve rapid removal of the heat of reaction are: the use of diluents for the ethylene (e. g., the use of industrial gases containing olefins, such as cracking still gases); the use of a reaction vessel constructed of, or lined with, a metal or alloy of high thermal conductivity; the initiation of the reaction by means of an internal heating element of small heat capacity exposed within a cold walled reaction vessel; efficient stirring of the system during reaction either mechanically or by inducing turbulent flow. Naturally, combinations of these and the use of other suitable heat-dissipation measures may be adopted.

It is difficult to define the critical temperature accurately, because it depends upon the other reaction conditions, but employing 1500 atmospheres, and 0.10 per cent oxygen it must not be allowed to exceed 400° C. and preferably should be about 200° C.; if higher pressures are employed than this temperature must be lowered. It is also difficult to define the lower limit of oxygen content in the ethylene required to initiate the rapid polymerization reaction, but employing 1500 atmospheres pressure and 190° to 210° C. it should be from about 0.03 per cent by weight to about 0.10 per cent.

A particular feature of the process of this invention is that it can be operated under such conditions that the slow type of reaction will occur along with the rapid type, which is equivalent to obtaining rapid polymerization to a certain extent followed by slow polymerization to bring up the yield to the desired figure. The process of this invention may suitably be operated continuously for the production of semi-solid or solid polymers; in this embodiment the ethylene containing a small but definite amount of oxygen is compressed and heated (e. g., by passage over a heated surface or through a heated reaction space) to effect polymerization, the oxygen content being at the same time apparently used up; the resulting polymer is separated from the unconverted ethylene and the latter recycled along with fresh ethylene and oxygen for a further polymerization.

The physical properties of the reaction products obtained depend upon the pressure at which the polymerization is effected; for example, polymers obtained employing pressures above about 1000 atmospheres are solids which in compact form are tough and waxy in feel, while polymers obtained using pressures below 1000 atmospheres, e. g., 500 atmospheres are hydrocarbon greases. The properties of these greases may be modified, however, by subjecting them to distillation in a short path still, e. g., a still in which the distilling and condensing surfaces are usually 1 to 5 centimeters apart, under a vacuum of $10^{-2}$ to $10^{-6}$ millimeters of mercury.

The conditions under which the polymers are recovered from the unconverted ethylene are also important factors determining their physical state; thus, if the product is allowed to cool under substantially the polymerization pressure it is found as a finely divided white powder of low packing density, while if the pressure is released while the product is still at substantially the reaction temperature it is found as a tough solid which softens at temperatures up to about 120° C., the particular temperature depending upon the pressure conditions employed in its preparation.

The following examples are illustrative of the practice of this invention:

Example I

Ethylene containing 0.08 per cent oxygen was compressed in a steel bomb to a pressure of 1500 atmospheres. The temperature of the bomb was then raised to 200° C. when a very rapid reaction took place as evidenced by a sudden rise on the pressure gauge followed by a fall in pressure of about 150 atmospheres. The bomb was opened and as a result of this rapid initial reaction 15 per cent of the ethylene was found to have been polymerized. The unconverted ethylene contained no measurable quantity of oxygen.

Example II

Ethylene containing 0.05 per cent oxygen was compressed in a steel bomb to a total pressure of 1500 atmospheres and heated rapidly to 210° C., whereupon a sudden rise on the pressure gauge was observed followed by a drop in pressure. After five hours' heating at 210° C., the pressure was released and the product allowed to cool to room temperature. Under these conditions an 80 per cent yield of polymer, based on the ethylene used, was obtained. The properties of the product were similar to those of the product of Example I.

Example III

Ethylene containing 0.06 per cent oxygen was compressed in a steel bomb to various pressures, and the temperature raised to 200° C. where it was held for two hours. The table below shows the initial pressure of the ethylene, and the molecular weight of the polymer formed in each case.

| Pressure in atmospheres | Molecular weight |
| --- | --- |
| 500 | 2000 |
| 1000 | 8000 |
| 1500 | 6000–12,000 |
| 3000 | 12,000–24,000 |

The above results show that the molecular weight of the polymer varies directly with pressure employed in the polymerization.

Example IV

Ethylene containing various concentrations of oxygen was compressed in a steel bomb to a pressure of 1500 atmospheres and the temperature raised until the sudden rise on the pressure gauge followed by a fall in pressure showed that the rapid reaction had occurred. The table below gives the initial concentration of oxygen, the percentage conversion, and the molecular weight of the product.

| Percentage oxygen content of the ethylene | Percentage yield | Molecular weight |
| --- | --- | --- |
| 0.01 | 6 | 18,000 |
| 0.04 | 9 | 12,000 |
| 0.07 | 10 | 10,000 |
| 0.13 | 25 | 6,000 |

In a further series of experiments the gas was compressed initially to 1000 atmospheres, the temperature as before being raised until the sudden rise on the pressure gauge followed by a fall in pressure showed that the rapid reaction had occurred. The results of this series of experiments are tabulated below:

| Percentage oxygen content of the ethylene | Percentage yield | Molecular weight |
|---|---|---|
| 0.21 | 6 | 5000 |
| 0.63 | 20 | 2500 |

The results in the above two tables show that the yield of polymer varies directly with the oxygen content of the ethylene; the molecular weight of the polymer, however, varies inversely with the oxygen content of the ethylene.

Example V

A steel bomb of 80 cc. capacity was filled with ethylene containing 0.06 per cent oxygen until the initial pressure was 1500 atmospheres. The temperature was then raised to 180° C. when a sudden rise on the pressure gauge followed by a drop in pressure occurred, indicating that the rapid reaction had taken place. The temperature was kept constant, and after 15 minutes (during which time the pressure showed a steady drop) more ethylene was compressed into the bomb to bring the pressure back to 1500 atmospheres. This procedure was repeated for three hours, after which time the bomb was opened. The yield of polymer was 25 grams and the molecular weight thereof 12,000.

Example VI

Ethylene containing 0.06 per cent oxygen was compressed to 1500 atmospheres and forced at this pressure through a steel reaction vessel containing an internal heating element maintained at a temperature of 230° C. The walls of the main reaction vessel were kept below 100° C. by means of a water-jacket. After passing through the reaction space the ethylene and the polymer which was formed were released through a suitable valve. Approximately 10 per cent of the ethylene was found to have been converted to polymer, the molecular weight of which was found to be 8,000.

The molecular weights given in the above examples were determined by measuring the viscosity of dilute solutions in tetrahydronaphthalene at 75° C. in accordance with the method described by Staudinger in Zeitsch. Phys. Chem. 129, 171 (1934). The values given in the above tables are to be taken as relative, but probably of the right order of magnitude.

The properties of the polymers depend to some extent upon their molecular weight; thus the products of high molecular weight are harder than those of low molecular weight, soften at a higher temperature, have improved mechanical properties, and are less readily soluble in such organic solvents as benzene, toluene, xylene, petroleum ether, tetrahydronaphthalene, carbon tetrachloride, trichloroethylene, amyl acetate, etc.; their solubility in these solvents, however, increases with the temperature, the increase being particularly rapid at 60 to 80° C. Water, ethanol, amyl alcohol, ethyl ether, acetone, chloroform, and glycerin are nonsolvents for the polymer, even at their boiling points.

An outstanding property of the polymers of this invention is their chemical inertness, as shown by the fact that they are unaffected by contact with inorganic acids and alkalis either in the cold or at 80 to 90° C.

As will be seen from the foregoing description, the present process due to the increased speed of the reaction, and its adaptability to continuous operation, provides a highly advantageous and economical method for the production of semi-solid and solid polymers from ethylene and other open-chain mono-olefins. These new polymers possess unusual properties; thus, they have a relatively high decomposition temperature, about 200° C. in air, and when heated in a high vacuum show a negligible vapor pressure at temperatures up to about 300° C. This latter property makes these polymers highly useful as seal lubricants for vacuum joints maintained at temperatures above the softening point of the polymer. The seal once made is effective not only at elevated temperatures but also at low temperatures, e. g., that of liquid nitrogen. Further, the seal may be repeatedly heated and cooled without breaking the vacuum.

The higher molecular weight polymers may be molded or cast to give shaped masses by subjecting them, in suitable shaped molds, to the action of pressure at temperatures above their softening points.

The polymers produced in accordance with this invention are also useful in the impregnation of textiles, paper, leather, etc.; as adhesives in the preparation of safety glass and other laminated articles; as protective coatings for metals, stone, shotgun shells, etc.; as bullet lubricants, etc.; in the sealing of carboys and acid bottles, etc.; in the preparation of shoe and furniture polishes, etc.

As many widely different embodiments of this invention may be made without departing from the spirit or scope thereof, it is to be understood that we do not limit ourselves to the specific embodiments thereof, except as defined in the appended claims.

We claim:

1. A continuous process for producing polymers from ethylene which comprises heating ethylene at a pressure of at least 500 atmospheres in the presence of a quantity of oxygen varying from about 0.01 per cent to about 5 per cent by weight of the ethylene, removing the polymer formed, and then repeating the process with a further and similarly limited quantity of oxygen.

2. A process for producing semi-solid and solid polymers from ethylene which comprises subjecting ethylene containing oxygen in an amount from about 0.01 per cent to about 5 per cent on the weight thereof to a pressure of from about 500 to about 3000 atmospheres and a temperature of from about 100° C. to about 400° C. under conditions providing for the continuous removal of the heat of reaction.

3. The process of claim 2 characterized in that a diluent for the ethylene is also included in the reaction mixture.

4. Process for preparing semi-solid and solid polymers of ethylene which comprises heating ethylene at a pressure of more than 500 atmospheres and at a temperature between 100 and 400° C. in the presence of about 0.01% to about 55% oxygen on the weight of the ethylene.

5. Process for preparing semi-solid and solid polymers of ethylene which comprises heating ethylene at a pressure of more than 500 atmospheres and at a temperature of between 150 and 250° C. in the presence of from about 0.01% to about 5% oxygen on the weight of the ethylene.

6. Process for preparing semi-solid and solid polymers of ethylene which comprises heating ethylene at a pressure of more than 1000 atmospheres and at a temperature of between 150 and 250° C. in the presence of from about 0.01% to about 5% oxygen based on the weight of the ethylene.

7. Process for producing semi-solid and solid polymers of ethylene which comprises heating ethylene at a pressure of more than 500 atmospheres and at a temperature of between 100 and 400° C. in the presence from about 0.01% to about 5% oxygen, on the weight of the ethylene, and dissipating the heat of reaction by initiating the reaction by means of an internal heating element of small heat capacity in a cold walled reaction vessel.

8. Process for preparing semi-solid and solid polymers of ethylene which comprises heating ethylene at a pressure of more than 500 atmospheres and at a temperature between 100 and 400° C. in the presence of about 0.01% to about 5% oxygen on the weight of the ethylene, and dissipating the heat of reaction by inducing turbulent flow during the reaction.

9. A process for preparing semi-solid and solid polymers of ethylene which comprises heating ethylene at a pressure of more than 1000 atmospheres at a temperature of between 150° and 250° C. in the presence of a small amount of oxygen not exceeding about 5% based on the weight of the ethylene.

10. Process for preparing semi-solid and solid polymers of ethylene which comprises heating ethylene at a pressure of 1500 atmospheres and at a temperature of between 190° to 210° C. in the presence of from about 0.03 to 0.10% oxygen based on the weight of the ethylene.

MICHAEL WILLCOX PERRIN.
JOHN GREVES PATON.
EDMOND GEORGE WILLIAMS.

---

CERTIFICATE OF CORRECTION.

Patent No. 2,188,465.                                         January 30, 1940.

MICHAEL WILLCOX PERRIN, ET AL.

It is hereby certified that error appears in the printed specification of the above numbered patent requiring correction as follows: Page 3, second column, line 71, claim 4, for "55%" read 5%; page 4, first column, line 14, claim 7, after the word "presence" insert of; and that the said Letters Patent should be read with this correction therein that the same may conform to the record of the case in the Patent Office.

Signed and sealed this 20th day of February, A. D. 1940.

(Seal)

Henry Van Arsdale,
Acting Commissioner of Patents.

CERTIFICATE OF CORRECTION.

Patent No. 2,188,465. January 30, 1940.

MICHAEL WILLCOX PERRIN, ET AL.

It is hereby certified that error appears in the printed specification of the above numbered patent requiring correction as follows: Page 3, second column, line 71, claim 4, for "55%" read 5%; page 4, first column, line 14, claim 7, after the word "presence" insert of; and that the said Letters Patent should be read with this correction therein that the same may conform to the record of the case in the Patent Office.

Signed and sealed this 20th day of February, A. D. 1940.

Henry Van Arsdale,
Acting Commissioner of Patents.

(Seal)